UNITED STATES PATENT OFFICE.

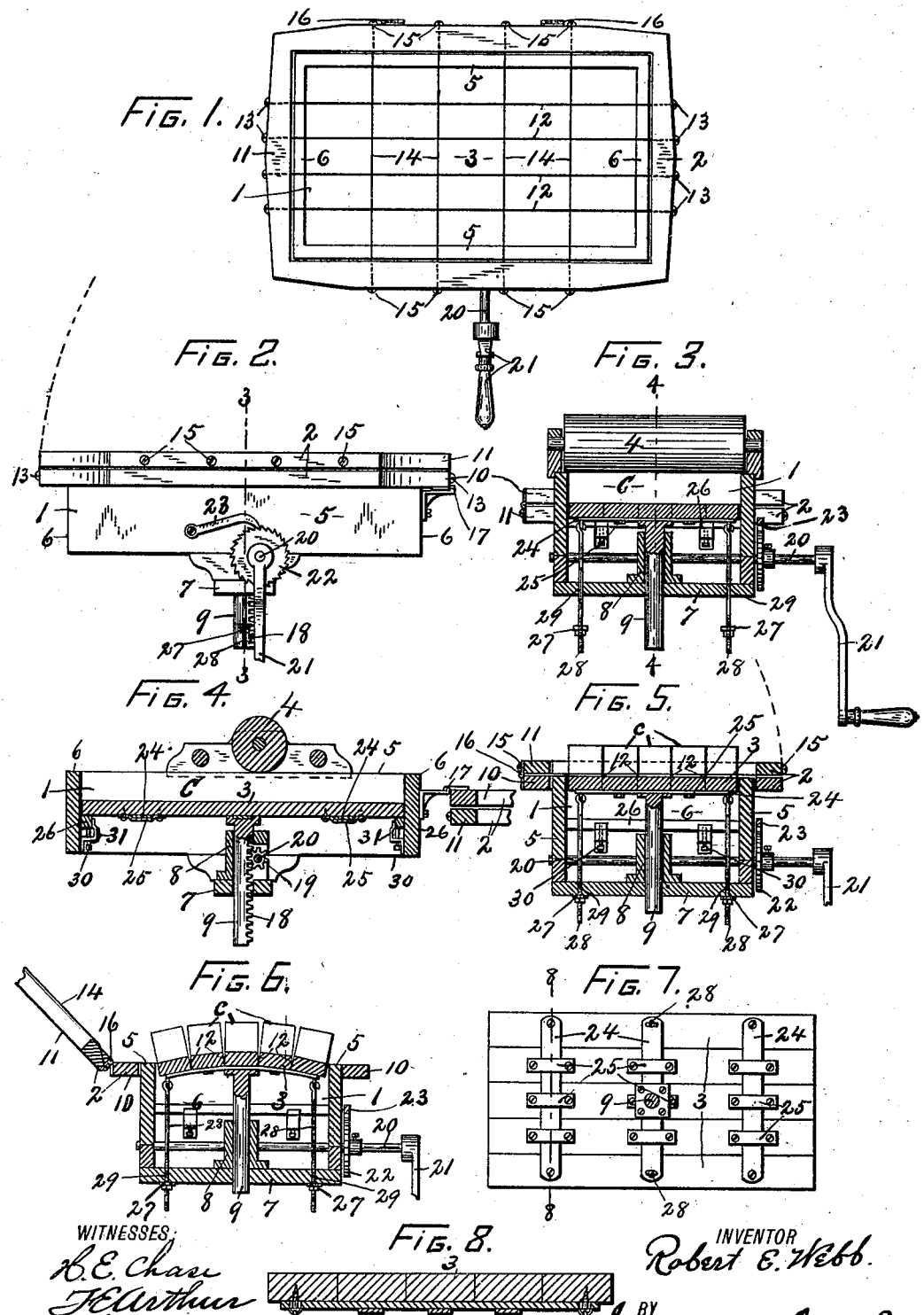

ROBERT E. WEBB, OF SYRACUSE, NEW YORK.

APPARATUS FOR MAKING MOLDS OF BUTTER, &c.

SPECIFICATION forming part of Letters Patent No. 660,939, dated October 30, 1900.

Application filed February 7, 1900. Serial No. 4,415. (No model.)

*To all whom it may concern:*

Be it known that I, ROBERT E. WEBB, a citizen of the United States, residing at Syracuse, in the county of Onondaga, State of New York, have invented a new and useful Butter Cutting and Printing Machine, of which the following is a specification.

My invention relates to improvements in apparatus for making molds of butter and similar substance of uniform size and weight; and has for its object the production of a simple and practical device for uniformly compressing the butter or other substance into a large mold and then subdividing the same into a plurality of symmetrical molds of substantially uniform shape, size, and weight.

To this end the invention consists in the apparatus substantially as hereinafter fully described, and pointed out in the claims.

In describing the invention reference is had to the accompanying drawings, forming a part of this specification, in which like characters indicate corresponding parts in all the views.

Figures 1 and 2 are respectively a top plan and side elevation of my improved apparatus, the cutting members and supporting-frame therefor being shown in operative position and the pressure-roller being removed. Figs. 3 and 4 are sectional views taken, respectively, on lines 3 3, Fig. 2, and 4 4, Fig. 3, the cutting members and supporting-frame therefor being moved to their inoperative position and the pressure-roller being shown as operatively mounted on the receptacle for compressing the butter or similar substance therein. Figs. 5 and 6 are sectional views taken on line 3 3, Fig. 2, the movable supporting-wall being shown in Fig. 5 as moved into engagement with the cutters and the body of butter as subdivided into molds of uniform size, and in Fig. 6 as forced to its limit of movement for separating the longitudinal series of molds. Fig. 7 is an inverted plan of the detached movable wall, and Fig. 8 is a transverse sectional view taken on line 8 8, Fig. 7.

The apparatus herein shown preferably consists of a receptacle 1, a cutter-supporting frame 2, a movable wall 3, and a pressure-roller 4.

The receptacle 1 may be of any desired size or form and preferably consists of a rectangular open frame having opposite side walls 5 5 and end walls 6 6, connecting the corresponding ends of the side walls together and having their upper ends arranged in substantially the same plane as the side walls 5 5. The upper portions of the side walls 5 5 are arranged substantially parallel with each other and form suitable guides or ways for receiving the supporting-frame of the pressure-roller 4, presently described.

7 represents a cross-bar connecting the lower edges of the intermediate portions of the side walls of the frame 1 and is provided with a substantially upright guide 8 for receiving a reciprocally-movable plunger 9, secured to the movable wall 3, previously mentioned. The cutter-supporting frame 2 preferably consists of separate substantially rectangular lower and upper sections 10 11, hinged to each other and to the frame at substantially right angles to each other, and each is provided with a substantially central opening usually formed of greater area than the opening of the frame 1 and normally alined with said opening of the frame 1. The lower section 10 preferably incloses the upper portion of the frame 1, is hinged at one end to the outer face of the adjacent end wall 6, and its upper face is normally disposed in a plane substantially coincident with the upper edges of the side and end walls 5 6.

12 represents a plurality of cutters consisting of substantially parallel wires arranged equidistant from each other and from the inner lengthwise faces of the side walls 5 5 and having their opposite ends secured in any desired manner, as by screws 13, to the end walls of the lower section 10. The cutters 12 are disposed in a plane substantially coincident with the upper face of the section 10 and normally with the upper edges of the side and end walls 5 6 and serve to divide the space between the walls 5 of the frame 1 into a series of lengthwise subdivisions of substantially equal width.

The upper section 11 is usually of substantially the same form as the lower section 10, is mounted upon said lower section, and is hinged thereto at substantially right angles to the former hinged connection between said lower section and the frame 1 and preferably to the longitudinal walls of said lower section.

14 represents a plurality of cutters arranged transversely of the former cutters 12 and preferably consist of a series of substantially parallel wires arranged equidistant from each other and from the inner faces of the end walls of the frame 1 at right angles to the cutter 12. The cutters 14 are normally disposed in planes substantially coincident with the upper faces of the cutters 12, are secured at their opposite ends to the side walls of the upper section 10 by suitable fastening means, as screws 15, and are movable with the section 10 independently of the cutters 12 into and out of inoperative position.

It will thus be apparent from the foregoing description that the cutters 12 and 14 normally rest upon the upper edges of the frame 1, that the cutters of the upper section may be moved upon hinges 16 into and out of operative position independently of the cutters of the lower section, and that both upper and lower sections may be moved simultaneously upon hinges 17. The wall 3 is reciprocally movable in the receptacle 1 and is preferably secured at its intermediate portion to the upper end of the plunger 9. Any suitable means may be employed for reciprocating said plunger and the wall 3; but I preferably provide the plunger with a tooth-rack 18, meshing with a pinion 19, provided on a revoluble shaft 20. The shaft is provided with a suitable crank 21 and a ratchet-wheel 22, the teeth of which are adapted to engage a suitable stop-pawl 23 for preventing retrograde movement of the shaft 20 and holding the wall 3 in its adjusted position.

As preferably constructed, the wall 3 is composed of a series of longitudinal strips of wood or other suitable material secured together by flexible strips 24. The opposite ends of each of the strips 24 are secured by suitable fastening means, Fig. 7, to the outer lengthwise strips of the wall 3, and their intermediate portions are secured to each of the intermediate strips by straps 25. This means of securing the several lengthwise strips together produces a flexible wall for purposes hereinafter described.

The wall 3 is normally disposed in a plane beneath the upper edges of the side and end walls of the receptacle 1 and is usually supported on bearings 26, provided on the inner face of the end walls of the receptacle 1. The upward movement of the wall 3 is limited by suitable stop-shoulders 27, adjustably secured to rods 28, depending from the wall 3 and movable in guides 29, provided on the transverse bar 7. The rods 28 are preferably secured in proximity to the outer longitudinal edges of the wall 3, and the stop-shoulders 27 engage the lower face of the transverse bar 7 for limiting the movement of the outer longitudinal strips. The plunger 9 being secured to the intermediate or central strips serves to force the intermediate portion of the wall upwardly after the shoulders 27 have engaged to transverse bar 7, thereby separating the contiguous edges of said strips and separating the lengthwise series or molds C, of butter or other substance, from each other. The bearings 26 are usually mounted in guides 31 and are adjusted vertically by adjusting-screws 30 for varying the depth of the body of butter or other substance C within the receptacle.

In the operation of my invention the cutter-supporting frame 2 is moved to its inoperative position, as seen in Figs. 3 and 4. The butter or other substance is then placed in the receptacle upon the wall 3. The pressure-roller 4 is then moved along the upper edges of said receptacle, thereby forming the butter or other substance into a compact mass. The pressure-roller 4 is then removed and the cutter-supporting frame 2 is placed in operative position, as seen in Figs. 1 and 2, with the cutters arranged substantially coincident with the upper edges of the walls of the receptacle. The movable wall 3 is then forced upwardly by means of the crank 21, thereby forcing the body of butter or other substance upwardly and cutting the same into a series of molds of substantially uniform size, form, and weight. The upper section of the cutter-supporting frame 2 is then moved to its inoperative position upon the hinges 16, and the intermediate portion of the walls 3 is then forced upwardly for separating the several longitudinal series of molds from each other. During this latter movement the longitudinal cutters or wires 12 enter the spaces between the several longitudinal strips, thereby removing all obstacles from the upper face of the wall 3. The molds may then be removed by hand without injury.

It will be apparent from the foregoing description and the accompanying drawings that as the upper section of the cutter-supporting frame 2 is swung into its inoperative position the cutters of said section move in planes substantially coincident with the contiguous faces of the molds and prevent any injury to said molds.

The operation of my invention will now be readily understood upon reference to the foregoing description and the accompanying drawings, and it will be noted that considerable change may be made in the detail construction of the component parts of the apparatus herein shown and described without departing from the spirit of this invention.

Having thus fully described my invention, what I claim as new, and desire to secure by Letters Patent, is—

1. An apparatus for making molds of butter or similar substance, the same comprising a receptacle having an opening for receiving the butter, a flexible wall movable in the receptacle, cutters arranged transversely of each other in the path of the moving wall, means for limiting the movement of opposite edges of the wall, and additional means for moving the intermediate portions of the wall beyond the limit of the movement of its opposite edges.

2. An apparatus for making molds of butter or similar substance, the same comprising a receptacle having an opening for receiving the butter, a flexible wall movable in the receptacle and formed of substantially the same area as the opening, a cutter-supporting frame surrounding the opening and composed of separate sections each provided with a series of parallel cutters, the cutters of one section being arranged transversely of the cutters of the other section, means for limiting the movement of opposite edges of the movable wall, and additional means connected to the intermediate portion of the wall for actuating said wall and forcing the intermediate portion thereof beyond the limit of the movement of its opposite edges.

3. An apparatus for making molds of butter or similar substance, the same comprising a frame having an opening provided with parallel side and end walls, a flexible supporting-wall movable in the opening and having its upper face formed of substantially the same area as the opening, a cutter-supporting frame composed of separate sections each having a series of parallel cutters extending across the opening, the cutters of one section being arranged parallel with the side walls of the opening in such manner as to divide the opening into a series of parallel subdivisions of equal area, and the cutters of the other section being arranged parallel with the end walls in such manner as to divide the opening into a series of parallel transverse subdivisions of equal area, means for limiting the movement of opposite edges of the supporting-wall, and additional means connected to the supporting-wall for moving the same toward and away from the cutters and for forcing the intermediate portion of the wall beyond the limit of movement of its opposite edges.

4. An apparatus for making molds of butter or similar substance, the same comprising a frame having a rectangular opening, a rectangular flexible supporting-wall movable in the opening and having its upper face formed of substantially the same area as the opening, a cutter-supporting frame composed of separate rectangular sections surrounding the opening, and each provided with a series of parallel cutters, the cutters of one section being arranged parallel to the side walls of the opening and the cutters of the other section being arranged parallel with the end walls of the opening, one of the sections being hinged to one of the end walls of the frame and the other section being hinged to the lengthwise wall of the former section, means for limiting the movement of opposite edges of the supporting-wall and additional means for moving said wall toward the cutters and for forcing the intermediate portion of said wall beyond the limit of movement of said opposite edges.

5. In an apparatus for making molds of butter, the combination of a plurality of cutters, and a flexible wall movable toward and away from the cutters.

6. In an apparatus for making molds of butter, the combination with a plurality of cutters, and a flexible wall movable toward and away from the cutters, said cutters being movable toward and away from said wall.

ROBERT E. WEBB.

Witnesses:
  H. B. SMITH,
  E. LAASS.